May 19, 1953          A. R. LONG          2,638,862
CLUTCH AND THROTTLE CONTROL FOR OUTBOARD MOTORS
Filed Dec. 13, 1950          4 Sheets-Sheet 1
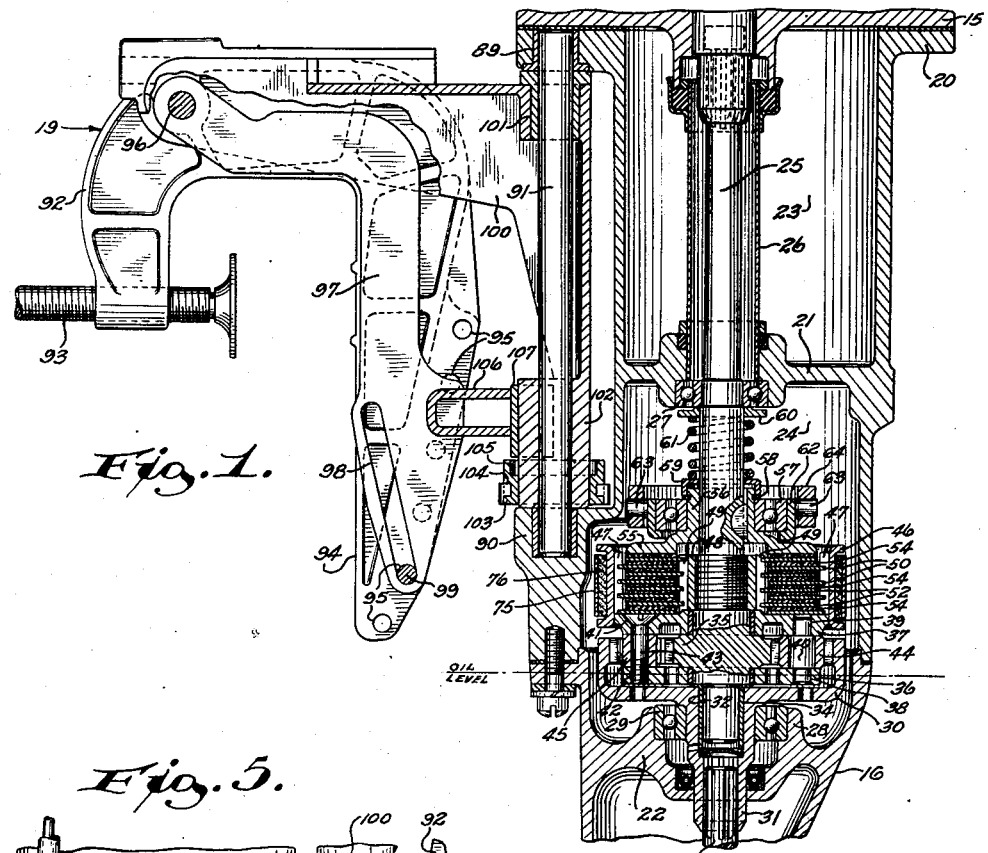
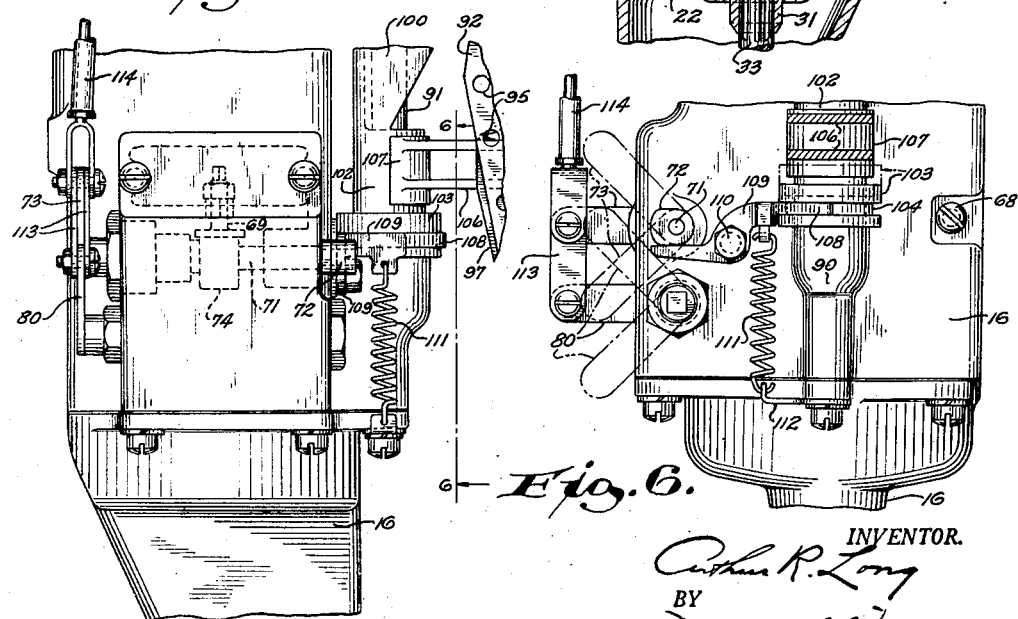
INVENTOR.
Arthur R. Long
BY
Minsell & Minsell
ATTORNEYS.

May 19, 1953  A. R. LONG  2,638,862
CLUTCH AND THROTTLE CONTROL FOR OUTBOARD MOTORS
Filed Dec. 13, 1950  4 Sheets-Sheet 2
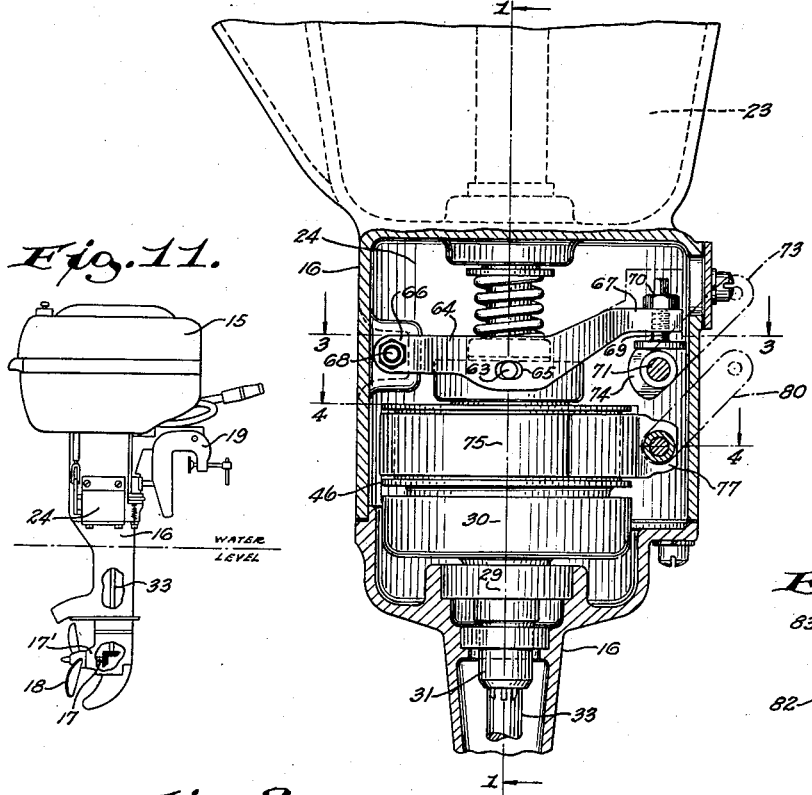
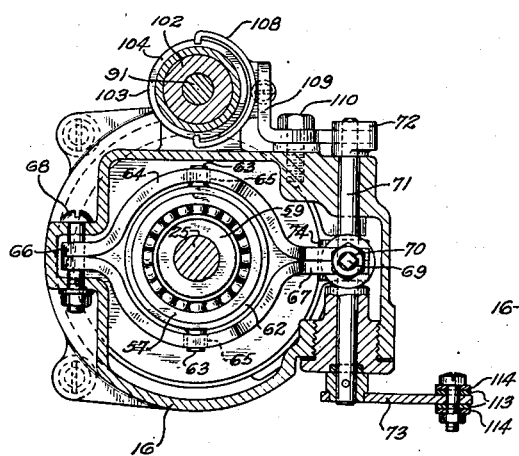
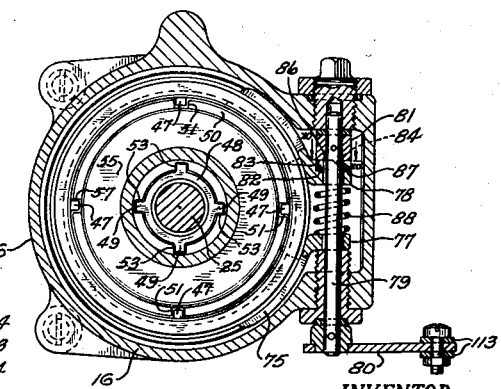
INVENTOR.
Arthur R. Long
BY
Morsell & Morsell
ATTORNEYS.

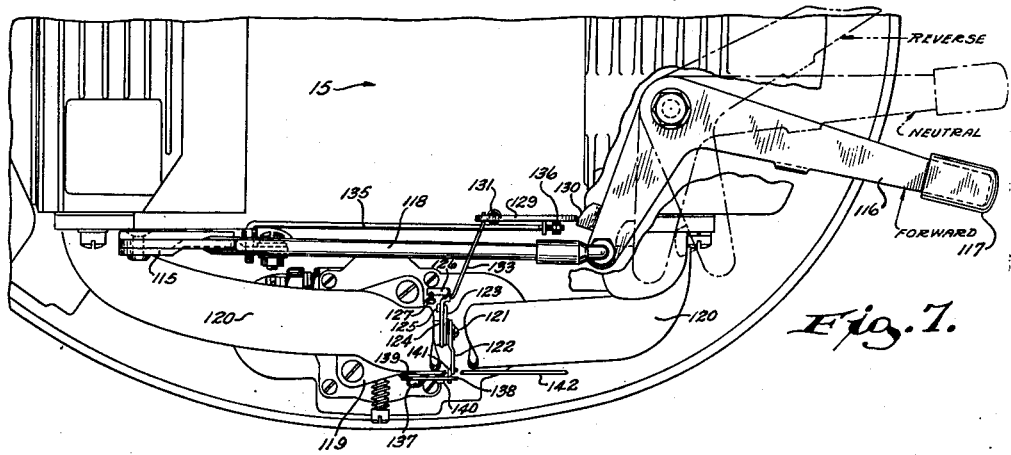

May 19, 1953 A. R. LONG 2,638,862
CLUTCH AND THROTTLE CONTROL FOR OUTBOARD MOTORS
Filed Dec. 13, 1950 4 Sheets-Sheet 4
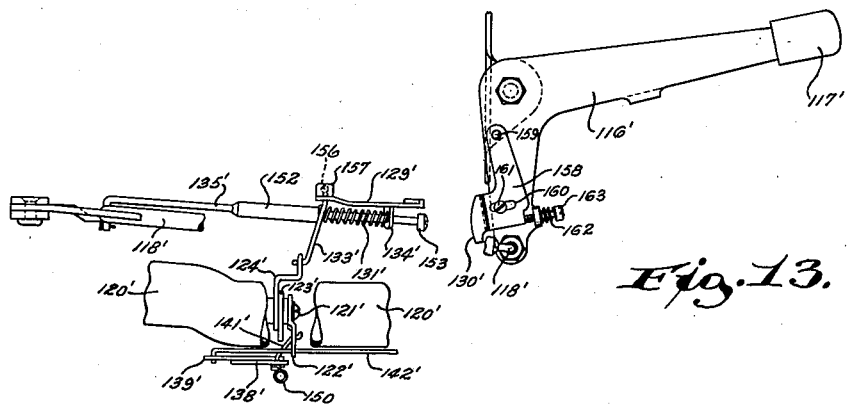
Fig. 13.
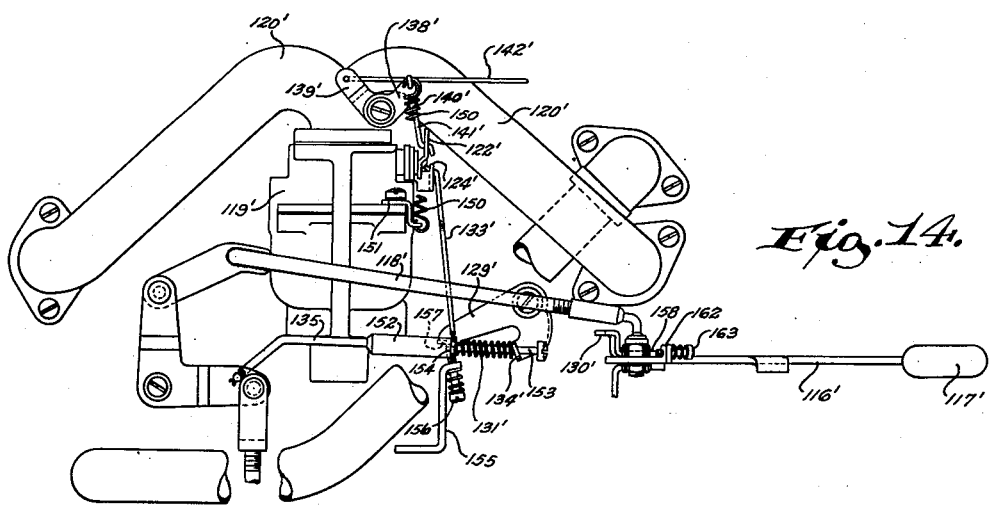
Fig. 14.
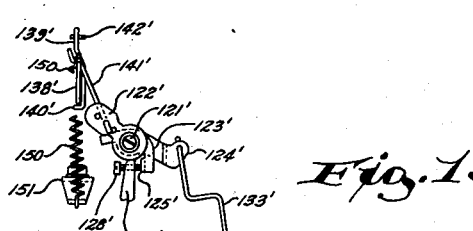
Fig. 15.
INVENTOR.
Arthur R. Long
BY
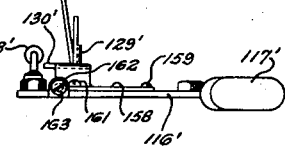
ATTORNEYS.

Patented May 19, 1953

2,638,862

UNITED STATES PATENT OFFICE 2,638,862

CLUTCH AND THROTTLE CONTROL FOR OUTBOARD MOTORS

Arthur R. Long, New Holstein, Wis., assignor to Hart-Carter Company, Peoria, Ill., a corporation of Delaware Application December 13, 1950, Serial No. 200,660

15 Claims. (Cl. 115—17)

This invention relates to improvements in outboard motors, and more particularly to outboard motors of the type provided with reversing mechanism.

Outboard motors have heretofore been provided with reversing mechanisms located in their propeller shaft housings, which mechanisms accomplish the reversing action by means of jaw clutches or gears which are shiftable into and out of engagement with each other. This type of reversing mechanism requires a relatively large propeller shaft housing which results in an increase in the resistance of the motor to movement through the water. In addition, it is a prerequisite to use of this type of reversing mechanism that the engine be slowed down to idling speed before shifting from one direction to the other. The reason for this is that jaw clutches or gears must engage during this shifting operation, and to shift them at high speed would result in clashing and possible serious injury thereto.

With the above in mind, it is a general object of the present invention to provide an improved outboard motor having a constant mesh transmission which can be shifted directly from forward to reverse or vice-versa without prior slowing down of the engine, and without any danger of injury to the transmission.

A further object of the invention is to provide an improved outboard motor of the class described wherein the reversing transmission provides a pre-determined gear reduction when shifted into reverse.

A further object of the invention is to provide an outboard motor of the class described wherein the transmission and the housing therefor are located adjacent to but above the waterline, thereby permitting the use of a relatively compact underwater structure and at the same time providing for dissipation of heat from the transmission to the water, not only by conduction downwardly through the drive shaft housing therebelow, but also directly to the water which splashes up onto the transmission housing during operation.

A further object of the invention is to provide an outboard motor of the class described having throttle limiting mechanism which is connected to the shifting lever in a manner to limit the speed of the motor whenever the motor is shifted into neutral or reverse positions, thereby eliminating any danger of the motor overspeeding when in in neutral or reverse, such overspeeding being a problem because of the decrease in load.

A further object of the invention is to provide an outboard motor of the class described wherein there is improved locking means, actuated upon shifting of the motor into reverse, for preventing the motor from pulling itself out of the water when so shifted.

A further object of the invention is to provide an outboard motor of the class described which provides easy maneuverability and docking of the boat, and which is quiet during the shifting operation.

A further object of the invention is to provide an improved outboard motor of the class described wherein the throttle linkage is readily adjustable to permit operation of the motor at a predetermined limited speed above idling when shifted into reverse.

A further object of the invention is to provide an outboard motor of the class described which is strong and durable, efficient and safe in operation, and otherwise well adapted for the purposes described.

With the above and other objects in view, the invention consists of the improved outboard motor, and all of its parts and combinations, as set forth in the claims, and all equivalents thereof.

In the drawings accompanying and forming a part of this specification, wherein is shown one complete embodiment of the preferred form of the invention, and wherein like characters of reference indicate the same parts in all of the views:

Fig. 1 is a fragmentary vertical sectional view from front to rear taken through the mounting assembly and transmission of the improved outboard motor, as indicated by the line 1—1 of Fig. 2;

Fig. 2 is a fragmentary rear elevational view of the improved outboard motor, the transmission casing being broken away to show the transmission mechanism therein;

Fig. 3 is a sectional plan view taken along the line 3—3 of Fig. 2;

Fig. 4 is a sectional plan view taken along the line 4—4 of Fig. 2;

Fig. 5 is a fragmentary elevational view of the left side of the improved outboard motor looking in the opposite direction from Fig. 1;

Fig. 6 is a fragmentary vertical sectional view taken approximately along the line 6—6 of Fig. 5;

Fig. 7 is a fragmentary plan view of the powerhead of the improved outboard motor;

Fig. 8 is a fragmentary elevational view of the right side of the powerhead of the improved outboard motor;

Fig. 9 is a schematic view showing the throttle limiting linkage;

Fig. 10 is a fragmentary transverse sectional view taken along the line 10—10 of Fig. 4;

Fig. 11 is a side elevational view of the improved outboard motor on a reduced scale;

Fig. 12 is a fragmentary schematic view showing a portion of the linkage of Fig. 9 in neutral and reverse position;

Fig. 13 is a fragmentary plan view of a modified form of throttle actuating linkage;

Fig. 14 is a fragmentary elevational view similar to Fig. 8 and showing the modified form of the invention shown in Fig. 13; and Fig. 15 is a fragmentary front elevational view of the modified form of throttle actuating linkage shown in Figs. 13 and 14.

Referring more particularly to Fig. 11 of the drawing, the improved outboard motor comprises, in general, a powerhead 15 which may include an internal combustion engine, an elongated hollow casing depending from the powerhead and having at its lower end a propeller shaft housing 17 and a propeller 18. The improved motor is adapted for connection to the transom of a boat by means of a clamp and bracket assembly 19 pivotally connected to the casing 16 in a manner to be later described.

The upper end of the elongated housing 16 is preferably enlarged as shown, and may have a flanged connection 20 (Fig. 1) with the powerhead. Spaced below the connection 20, the enlarged upper portion of the housing 16 is provided with a horizontal partition 21, and spaced below the partition 21 at the lower end of the enlarged portion of the casing 16 is a horizontal partition 22. An oil reservoir 23 is formed above the partition 21, and a transmission housing 24 between the partitions 21 and 22.

Extending from the powerhead 15 downwardly through the oil reservoir 23 is a drive shaft 25 which extends through a suitable aperture in the partition 21 into the lower portion of the transmission housing 24. A tubular sleeve 26, surrounds the drive shaft 25 within the oil reservoir 23, and is suitably sealed at its upper and lower ends, to the powerhead and partition 21 respectively, to isolate the drive shaft 25 from the oil within the reservoir 23. The drive shaft 25 is rotatably supported in a bearing 27 carried by the partition 21. The partition 22 is formed with an upstanding recessed boss 28 in which is mounted a bearing 29. A ring gear 30 is positioned in the transmission housing 24 and is formed with a depending coaxial, tubular extension 31 having a cylindrical bore portion 32 at its upper end, and being internally splined at its lower end to receive a driven shaft 33. The tubular extension 31 is rotatably supported in the bearing 29 as shown, and a sleeve bearing 34 is positioned in the bore 32 to rotatably receive the lower end of the drive shaft 25, as shown.

Spaced above the sleeve bearing 34, the drive shaft 25 is formed with an integral, coaxial sun gear 35. Rotatably mounted on the drive shaft 25 immediately above and below the sun gear 35 are a pair of parallel, preferably circular carrier plates 36 and 37. The carrier plates 36 and 37 are formed with aligned apertures 38 and 39 to receive the ends of a bearing pin 40 as shown. The plate 37 is formed with a countersunk aperture 41, and the plate 36 with a coaxial threaded aperture 42 to receive a flat headed connecting screw 43 as shown. A planet pinion 44, rotatably mounted on the bearing pin 40 between the plates 36 and 37, meshes with the sun gear 35 and with the ring gear 30. A spacer sleeve 45 surrounds the connecting screw 43 between the plates 36 and 37. More than one planet pinion 44 may be used.

A circular rim 46, which is channel shaped in cross section and which has annular outwardly projecting edge flanges, is coaxially fixed, as by welding, to the carrier plate 37 and forms a brake drum therefor. Formed on the inner surface of the rim 46 are preferably four equally spaced, axially extending ribs 47. Threadedly fixed on the shaft 25 radially inwardly of the rim 46 is a collar 48 which is preferably formed with four external, equally spaced, axially extending ribs 49. A plurality of circular metal plates or clutch discs 50, having diameters slightly less than the inner diameter of the rim 46 are formed with central apertures slightly larger than the diameter of the collar 48 plus its lugs 49, and are positioned around said collar within the rim 46. The plates 50 are formed with rectangular peripheral notches 51 which axially slidably, but non-rotatably, receive the ribs 47 of the rim 46 as shown in Fig. 4. Preferably four circular metal plates or clutch discs 52, having diameters slightly less than the diametric distance between opposing ribs 47 and formed with central apertures slightly larger than the outer diameter of the collar 48 are positioned around said collar within the rim 46. The plates 52 are formed with rectangular notches 53 in the margin of the central aperture thereof, said notches axially slidably and non-rotatably receiving the ribs 49 of the collar 48, as shown in Figs. 1 and 4. The plates 52 are alternated with the plates 50 in laminated relationship, and between adjacent plates 52 and 50, are centrally apertured circular plates of friction material 54, said plates having outside diameters equal to the diameters of the plates 52 and having central aperture diameters which are of substantially the same size as the central apertures in the plates 50.

A circular pressure plate 55 is formed with an upstanding, axial tubular extension 56 which is keyed on the drive shaft 25 for axially slidable movement therealong. A bearing 57 is fixed on the tubular extension 56 as by a snap ring 58. A thrust collar 59 is positioned around the shaft 25 and has a downwardly projecting peripheral rim in engagement with the snap ring 58. A second thrust collar 60 is positioned around the shaft 25 and is provided with a coaxial boss on its upper surface positioned in engagement with the portion of the bearing 27 which is fixed to the shaft 25. A helical compression spring 61 encircles the shaft 25 and urges the thrust collars 59 and 60 in opposite directions. A collar 62 surrounds the bearing 57 and is formed with an inturned flange at its lower edge. A pair of diametrically aligned trunnions 63 are formed on and project outwardly from the collar 62.

Referring to Figs. 1, 2 and 3, a yoke 64 encircles the collar 62 and is formed with slots 65 to loosely receive the trunnions 63. The yoke 64 is formed with diametrically oppositely directed ears 66 and 67, and said yoke is pivotally mounted on a horizontal bolt 68 which extends through the ear 66 and which is suitably supported at one side of the housing 16. The ear 67 is vertically apertured to threadedly receive a cam follower screw 69 which has a lock nut 70 threaded thereon. A horizontal cam shaft 71 is suitably journaled at one side of the casing 16 and has fixed to one end thereof exteriorly of the casing 16 a cam 72. Fixed to the opposite end of the shaft 71, exteriorly of the casing 16, is an operating lever 73. Fixed to the cam shaft 71 within the casing 16 is a cam 74. The spring 61 urges the yoke 64 downwardly and thereby holds the cam follower screw 69 in preferably loose contact with the cam 74.

A brake band 75 provided with a suitable brake lining 76 encircles the rim 46 between the edge flanges thereof. Referring to Fig. 4, the brake band terminates in a pair of apertured ears 77 and 78. A horizontal shaft 79 is rotatably mounted in the casing 16 parallel with and below the shaft 71, the shaft 79 extending loosely through the apertures in the ears 77 and 78 of the brake band 75 and having one end projecting exteriorly of the casing 16. Fixed on the projecting end of the shaft 79 is a brake operating lever 80. Fixed on the shaft 79 adjacent the ear 78 of the brake band is a cam 81.

Referring to Figs. 4 and 10, the ear 78 is formed with an annular cam surface 82 facing the cam 81. The cam surface 82 preferably has a sector 83 which is approximately 90 degrees in angular extent and which is spaced from the remainder of the cam surface 82 in a direction toward the cam 81, the parallel surfaces 82 and 83 being joined by an inclined surface 84 (see Fig. 4), which meets the surface 82 along the line 85 (see Fig. 10). The cam 81 is formed with a flat annular end surface 86 which, in Fig. 4, abuts the surface 83 of the ear 78. The annular surface 86 preferably extends angularly about 270 degrees. The cam 81 is formed with a cam projection 87 having a flat end surface spaced from the annular surface 86 in a direction toward the ear 78 a distance substantially equal to the spacing between the surfaces 82 and 83 of said ear. The flat end surface of the cam projection 87 is joined to the flat surface 86 by an inclined surface preferably having substantially the same angularity and extent as the inclined surface 84 of the ear 87.

In Figs. 4 and 10 the inclined surfaces of the cam 81 and ear 78 are in substantially complete surface contact. It is apparent from the drawing that if the operating lever 80 is lifted from the horizontal position shown, the cam projection 87 will slide along the flat surface 82 and no motion will be imparted to the ear 78. If, however, the arm 80 is moved downwardly from the horizontal position shown in Fig. 4, the cam projection 87 will ride up on the inclined surface 84 of the ear 78 to bring the flat end surface of said projection into contact with the cam surface 83 of the ear 78. In so moving, the cam 81 will force the ear 78 toward the ear 77 and will thereby tighten the brake band 75. A compression spring 88 surrounds the shaft 79 and is interposed between the ears 77 and 78 and urges said ears apart.

Referring to Fig. 1, the front of the casing 16 is formed with a pair of spaced coaxial, vertically aligned bearings 89 and 90, and mounted on said bearings is a vertical shaft 91 which is spaced from the front wall of the casing 16 as shown. The mounting bracket assembly 19 preferably comprises a pair of C type clamps 92 each having a hand screw 93. The clamps 92 have elongated, depending rear legs 94, which legs are provided along rear edges with a plurality of apertures 95. Carried by the clamps 92 is a horizontal pivot bolt 96, and pivotally mounted on the bolt 96 are a pair of L-shaped brackets 97 which extend rearwardly and downwardly as shown. The brackets 97 may be provided with angled elongated slots 98 to receive a pin 99 which pin is positioned in a selected pair of aligned apertures 95 to hold the bracket 97 in a desired angular relationship with respect to the arm 94 of the clamp 92.

Also pivotally mounted on the bolt 96 is a bracket 100 which may be generally L-shaped and which also extends rearwardly and downwardly. The bracket 100 is formed adjacent its rear edge with a pair of coaxial vertically spaced bearings 101 and 102 through which the shaft 91 rotatably extends. The bearing 102 is preferably cylindrical in shape, and slidably mounted thereon is a collar 103 having a circumferential groove 104 and also having in its upper end surface, an annular recess 105. Extending transversely between, and integral with the brackets 97 is a member 106 which may be U-shaped in cross section and which projects rearwardly from said brackets. The member 106 carries at its rear end an arcuate plate 107 which is integral and which is substantially semicircular in horizontal section. The arcuate plate 107 normally embraces the cylindrical bearing 102 as shown. The thickness of the arcuate plate 107 and the size of the annular recess 105 in the collar 103 are such that the collar can be slid vertically upwardly to the position shown in dot and dash lines in Fig. 6 wherein it overlaps the lower end of the plate 107 to thereby prevent relative lateral movement between said plate and bearing 102.

Referring to Figs. 3 and 6 a yoke 108, preferably semicircular, is positioned adjacent the collar 103 and has inwardly directed ears positioned in the groove 104 of said collar. The yoke 108 is fixed to a lever 109 which is L-shaped in plan view and which is pivotally mounted intermediate its length on a screw 110 on the front of the casing 16 between the bearing 90 and shaft 71. The end of the lever 109 opposite the yoke 108 is positioned in engagement with the underside of the cam 72 as shown, and a tension spring 111 is connected at one end to the lever 109 adjacent the yoke 108, and has its other end anchored to a bracket 112 suitably connected to the bottom of the bearing boss 90. The spring 111 pulls downwardly on the yoke 108 and thereby urges the collar 103 into the lowered position shown. In so doing, the spring 111 also urges the outer end of the lever 109 upwardly into frictional engagement with the cam 72.

Referring to Figs. 5, 6 and 8, the outer ends of the operating arms 73 and 80 are pivotally connected by a pair of links 113 in such a manner that said arms remain substantially parallel in all positions of movement. A vertically extending rod 114 is bifurcated at its upper and lower ends and is pivotally connected at its lower end to the outer end of the arm 73 at the connection of said arm with the links 113. At its upper end the rod 114 is pivotally connected to one arm of a bell crank lever 115 which lever is pivotally mounted on the powerhead 15 for movement on a horizontal axis. A shifting lever 116 in the form of a bell crank is mounted on the powerhead 15 for movement on a vertical axis, said lever having one arm projecting forwardly from the powerhead 15 and provided with a manually engageable grip 117. The other arm of the shifting lever 116 is linked to the other arm of the bell crank lever 115 by means of a rod 118. The position of the parts in Figs. 5, 7 and 8 correspond, and the linkage between the shifting lever 116 and operating arms 73 and 80 is such that movement of the shifting lever 116 in a counterclockwise direction from its position as viewed in Fig. 7 causes downward movement of the rod 114 and arms 73 and 80.

Referring to Figs. 7 and 8, the powerhead 15 may include a carburetor 119 which is connected to an intake manifold 120 having a branch leading to the intake port of each cylinder of the internal combustion engine. The carburetor 119 is provided with the usual butterfly type throttle valve therein (not shown) mounted on a rotatable throttle shaft 121 which shaft projects from the carburetor.

Fixed on the shaft 121 is a pair of juxtaposed oppositely directed throttle arms 122 and 123 which in effect form a single throttle arm fixed on the shaft 121. Freely rotatably mounted on the throttle shaft 121 is an auxiliary arm 124 which is adjacent to and longer than the arm 123. The arm 123 is formed at its outer end with a lip 125 which underlies the arm 124, and which is normally held in engagement with said arm by a conventional throttle shaft spring 123' (Fig. 9). The spring 123' urges the throttle valve and its shaft 121 in a counterclockwise direction as viewed in Fig. 9, said direction being toward the wide open position of the throttle. The outer end of the arm 124 is formed with a laterally directed ear 126, which ear carries an adjustable stop screw 127. The screw 127 is adapted to engage a portion 127' in a clockwise direction, as viewed in Fig. 9, and thereby provide a neutral speed setting, to be later described. A second adjustable stop screw 128 is mounted on the carburetor 119 in a position to be engaged by the lip 125 on the arm 123 to limit the travel of said arm in a clockwise direction, as viewed in Fig. 9, and thereby provide an idle speed setting to be later described.

A bell crank lever 129 is suitably pivotally mounted on the powerhead adjacent the inner arm of the shifting lever 116 for movement about an axis which is parallel with the axis of pivotal movement of the bell crank lever 115 and at substantially a right angle with the axis of the throttle shaft 121. The shifting lever 116 is formed adjacent the end of its inner arm with a cam 130 which is engageable with one arm of the bell crank lever 129 as shown. A tension spring 131, which is substantially stronger than the throttle shaft spring, is connected at one end to the other arm of the bell crank lever 129 and extends downwardly to a bracket 132 which is suitably anchored to the powerhead. It is apparent that the spring 131 urges the bell crank lever 129 in a counterclockwise direction as viewed in Fig. 8. A rod 133 links the bell crank lever 129 to the arm 124 on the carburetor shaft as shown. The lower arm of the bell crank lever 129 is formed with an apertured out-turned ear 134, and a rod 135 is pivotally connected at its left hand end to the bell crank lever 115 adjacent its connection to the rod 114, and the other end of said rod slidably extends through the aperture in the ear 134 of the bell crank lever 129. The right hand end of the rod 135 is provided with a nut and lock nut 136, as shown.

Freely rotatably mounted as on the screw 137 of the manifold 120, is a pair of arms 138 and 139. The axis of the screw 137 is preferably parallel with the axis of pivotal movement of the bell crank levers 115 and 129. The arm 139 is formed with a lip 140 which underlies the arm 138 as shown, and a rod 141 pivotally links the end portions of the arms 122 and 138. A manually operable rod 142 is pivotally linked to the end of the arm 139 and may be connected with a suitable manually operable throttle control lever (not shown).

Operation

When the shifting lever 116 is disposed in the position shown in Figs. 7 and 8, the parts of the transmission and throttle linkage are disposed as shown in Figs. 1, 2, 5, 7, 8 and 9. The throttle is fully open and the spring 131 is in stretched condition. In the transmission housing 24 the spring 61 urges the pressure plate 55 downwardly onto the clutch discs 50, 52 and 54 to create sufficient friction therebetween to lock said discs together and cause the rim 46 to be fixed to the collar 48 and to the shaft 25. The brake band 75 is released in this position, since the lever 80 is in upwardly inclined position and, as previously stated, raising of the lever 80 above a horizontal position has no effect upon the released condition of the brake band.

Rotation of the shaft 25 causes rotation therewith of the rim 46, carrier plates 36 and 37 and ring gear 30. Since the sun gear 35 is integral with the shaft 25, and since there is no relative rotation between said gear and the carrier plates 36 and 37, the planet pinion does not rotate on its axis. Rotation of the shaft 25 then results in a direct drive of the driven shaft 33 through the transmission, and this in turn causes rotation of the propeller drive shaft 17 and propeller 18 in a direction to impart forward movement to the boat to which the outboard motor is attached. While the throttle linkage is shown with the throttle shaft in wide open position, the speed of the engine can be readily reduced to any desired level by actuating the throttle control lever (not shown) in a manner to cause movement of the throttle rod 142 to the left, as viewed in Figs. 7 to 9. This causes counter-clockwise movement of the arms 139 and 138, and, through the link 141, causes clockwise rotation of the arms 122 and 123 and throttle shaft 121. As previously stated, clockwise rotation of the throttle shaft 121 moves the throttle valve toward closed position. If desired, the throttle valve can be moved to idle position in this manner regardless of the position of the shifting lever, lever 129, or arm 124.

Movement of the shifting lever 116 to the neutral position shown in dot and dash lines in Fig. 7 causes pivoting of the bell crank lever 115 by the rod 118 to the neutral position shown in dot and dash lines in Fig. 8. This moves the rod 114 vertically downwardly, and in turn causes movement of the arms 73 and 80 from the raised positions shown in Figs. 5 and 8 and in dot and dash lines in Figs. 3, 4 and 6, downwardly to the horizontal positions shown in Figs. 3, 4 and 6. Referring to Fig. 2, it will be apparent that downward movement of the arm 73 from the dot and dash line position shown in said figure causes clockwise rotation of the shaft 71 and cam 74, thereby causing said cam to raise the cam follower 69 and thereby swing the yoke 64 upwardly about its pivot 68. Referring to Fig. 1, it will be seen that raising of the yoke 64 causes upward movement therewith of the collar 62, bearing 57 and pressure plate 55. This movement acts to compress the spring 61. Release of the downward pressure on the disks 50, 52 and 54 by the pressure plate 55 permits relative rotation of the disks 50 and 52, thereby also permitting relative rotation of the rim 46 and collar 48 fixed to the shaft 25. Since the rim 46 is integral with the planet carrier formed by the plates 36 and 37, lifting of the pressure plate 55 permits free rotation of said planet carrier relative to the shaft 25 and sun gear 35. When this condition exists, rotation of the shaft 25 merely causes rotation of the planet carrier on the shaft 25 and rotation of the pinions 44 and 45 on their axes, and no motion is imparted to the ring gear 30 or shaft 33. As has been pointed out, the brake band 75 is released when the arm 80 is in horizontal position.

Movement of the shifting lever from forward to neutral position also causes movement of the cam 130 laterally out of contact with the bell crank lever 129. This permits the tension spring 131 to pull downwardly on said bell crank lever to rotate the same in a counter-clockwise direction as viewed in Figs. 8, 9 and 12 to the dot and dash line position thereof shown in Fig. 12. As the lever 129 is so moved, the link 133 pulls the arm 124 downwardly until the stop screw 127 abuts the portion 127' of the carburetor. As the arm 124 is so moved, the arm 123 is moved therewith by the lip 125, and such movement causes rotation of the throttle shaft 121 to a position wherein the throttle valve is in nearly closed or neutral position. This neutral position provides a throttle valve opening preferably slightly larger than idling speed throttle opening, and the neutral throttle setting is readily adjustable by turning the screw 127. If it is desired to slow the motor below neutral speed as set by the screw 127, the manual throttle control may be used to move the link 142 toward the left as viewed in Figs. 7 to 9, thereby causing further clockwise rotation of the throttle shaft 121 in the manner previously described until the lip 125 abuts the screw 128. Idling speed is thus attained, and this speed is readily adjustable by turning the stop screw 128.

It is apparent that movement of the shifting lever 116 from forward to neutral position, not only stops the transmission of power to the driven shaft 33 and propeller 18, but through the throttle limiting linkage it also automatically slows the engine to a speed only slightly above idling speed to prevent overspeeding due to the no load condition prevailing when the lever 116 is so shifted.

When the shifting lever 116 is moved to the reverse position shown in dot and dash lines in Fig. 7, the bell crank lever 115 is rotated by the rod 118 to the reverse position thereof shown in dot and dash lines in Fig. 8. This causes further downward movement of the rod 114 which in turn swings the arms 73 and 80 downwardly to their lowermost position shown in dot and dash lines in Fig. 6 and rotates the shafts 71 and 79 therewith. This movement of the arm 73 causes counterclockwise rotation of the cam 72, as viewed in Fig. 6, which in turn pivots the lever 109 to raise the yoke 108 and collar 104 so that said collar embraces the lower end portion of the arcuate plate 107, as shown in dot and dash lines in Fig. 6. This locks the bearing 102 to the bracket 97 and prevents rearward movement of the casing 16 away from the bracket 97 and clamps 92. As the cam 72 thus pivots the lever 109, the spring 111 is stretched, said spring being operable to move the lever 109 and collar 104 back to the position shown in solid lines in Fig. 6 whenever the cam 72 is later rotated to its position shown in Fig. 6.

Referring to Fig. 4, movement of the arm 80 downwardly from a horizontal position to its lowermost position causes the cam 81 to rotate, and in the manner previously described, to move the ear 78 of the brake band 75 toward the ear 77 of said band to thereby tighten said band on the rim 46. This locks the rim 46 and planet carrying plates 36 and 37 against rotation and holds the planet pinion 44 on a fixed axis. Referring to Fig. 2, it will be noted that movement of the arm 73 to its lowermost position shown in dot and dash lines in Fig. 6 causes the cam 74 to continue to hold the yoke 64 in raised position and to thereby permit continued rotation of the shaft 25 relative to the rim 46 and planet carrying plates.

In this condition, rotation of the shaft 25 and sun gear 35 causes rotation of the planet pinion 44 on its fixed axis, and rotation of the planet pinion on a fixed axis causes reverse rotation of the ring gear 30 at reduced speed. The reverse rotation at reduced speed is, of course, transmitted through the driven shaft 33 to the propeller shaft 17 and propeller 18. While a variety of speed ratios is possible in reverse, depending upon the size of the gears used, a planetary gear set which causes reverse rotation of the driven shaft 33 at half the speed of the drive shaft 25 has proven very satisfactory.

The length of the rod 135 is such that the nuts 136 are spaced from the ear 134 when the parts are disposed as shown in Figs. 7 to 9. When, however, the bell crank lever 115 is moved to the reversed position shown in dot and dash lines in Fig. 8, said lever pulls the rod 135 to the left bringing the nuts 136 into abutment with the ear 134, as shown in Fig. 12, to cause a slight clockwise rotation of the lever 129 to the position thereof shown in Fig. 12. This slight clockwise rotation of the lever 129 causes the rod 133 to raise the arm 124 slightly from its neutral position, and this permits the throttle valve spring to rotate the throttle shaft 121 and arms 122 and 125 a short distance toward open position. The amount of this opening is readily adjustable by varying the position of the nuts 136 on the rod 135. It is apparent, however, that the throttle linkage limits the speed of the engine in reverse to a predetermined safe level which is preferably slightly above neutral speed.

Due to the fact that outboard motor propellers are notoriously inefficient in reverse and therefore require very little power when so operated, there is great danger of overspeeding at such times, and the improved throttle limiting mechanism automatically prevents such overspeeding. In addition, such a speed limitation is necessary because the flat nature of a boat transom causes water to spill thereover into the boat when the boat is moved in a reverse direction through the water at too great a speed.

The improved motor can be shifted instantaneously from forward to reverse or vice-versa with complete safety and without requiring manual operation of a separate throttle control lever. Shifting of the shifting lever 116 automatically idles the engine when in neutral and limits the speed of the engine to a safe speed above idling when in reverse, while permitting any desired speed when shifted to forward position. Due to the fact that the improved motor embodies a constant mesh transmission, there is no danger of clashing of gears on shifting, and there is no requirement of slowing down the engine in any way prior to shifting.

Referring to Fig. 11, it will be noted that the transmission housing 24 is located just above the normal water level of the improved outboard motor. Lubrication for the planetary gear set in the transmission housing 24 is provided by a quantity of oil which is placed in the bottom of said housing, the level of the oil being indicated by the dot and dash line in Fig. 1. During operation, any heat created by friction of the parts of the transmission or its clutch is transmitted by the oil lubricating said transmission to the adjacent walls of the casing 16. Due to the fact that the transmission housing 24 is located close to the water level, water splashes onto the exterior of the adjacent casing 16, and the heat transmitted to said casing by the oil is dissipated by water which splashes onto the exterior of the casing as the motor moves through the water. It is also apparent that by having the transmission located above the water level, no increase in the underwater area is necessary, and the drive shaft housing 17' may therefore be kept small to maintain the water resistance at a minimum.

A modified form of throttle actuating mechanism is shown in Figs. 13, 14 and 15. In Figs. 13 to 15 the parts indicated by primed numerals are analogous to the parts in the principal form of the invention which are indicated by the same numerals unprimed.

Referring to Fig. 15 it will be noted that the auxiliary arm 124' does not carry a stop screw such as the screw 127 shown in Fig. 9. It will also be noted that in the modified form of the invention the torsion spring 123' of the principal form of the invention is replaced by a tension spring 150 which is connected at one end to the arm 138' and is suitably anchored, as at 151, on the carburetor 119'. The spring 150 urges the arm 138' downwardly and through said arm and the link 141', urges the arm 122' downwardly to urge the throttle shaft 121' in a counter-clockwise throttle opening direction.

As shown in Figs. 13 and 14, in the modified form of the invention the rod 135' is formed in two sections, one of which is provided with an integral internally threaded sleeve 152. The other section is formed by an elongated screw 153 which extends through the apertured lip 134' and is threaded coaxially into the sleeve 152. A lock nut 154 is threaded on the screw 153 adjacent the end of the sleeve 152. Positioned around the screw 153, and having its opposite ends in abutment respectively with the lock nut 154 and the lip 134', is a helical compression spring 131'. The compression spring 131' urges the bell crank lever 129' in a counter-clockwise direction as viewed in Fig. 14, and replaces the tension spring 131 of the principal form of the invention.

Suitably mounted on the powerhead adjacent the arm 129' is a bracket 155 which is apertured to threadedly receive a vertically extending adjustable stop screw 156. The arm 129' is formed adjacent its connection with the link 133' with a lip 157. The lip 157 is positioned for engagement with the end of the stop screw 156 to limit the rotation of the bell crank lever 129 in a counter-clockwise or throttle closing direction. Turning of the screw 156 adjusts the neutral speed throttle setting of the carburetor 119, and the screw 156 replaces the stop screw 127 on the auxiliary arm 124 of the principal form of the invention. The reverse throttle setting can be readily adjusted by turning the screw 153 to vary the length of the rod 135'. It will be noted that the screws 153 and 156 are located close to each other in a readily accessible low position on the powerhead.

As shown most clearly in Fig. 13, the cam 130 of the modified form of the invention is formed on an arm 158, the latter pivotally connected to the shifting lever, as at 159, for movement relative to and parallel with said lever. The arm 158 is slotted, as at 160, to receive a screw 161 which extends therethrough and is threaded into the shifting lever 116'. The shifting lever is formed with an upstanding apertured lip 162 adjacent the free end of the arm 158, and an adjustment screw 163 is threaded through the lip 162 and engages the arm 158 as shown. By loosening the screw 161 and turning the screw 163, the position of the arm 158 and cam 130' relative to the shifting lever 116' can be readily varied. The arm 158 can be locked in a selected position by tightening the screw 161.

The operation of the modified form of the invention is substantially the same as that of the principal form. The positioning of the adjustment screw 156 at a place which is readily accessible facilitates the adjustment of the neutral throttle position. The adjustable mounting for the cam 130' makes possible the adjustment of the full throttle opening provided by the linkage when the shifting lever 115' is in forward position.

Various changes and modifications may be made without departing from the spirit of the invention, and all of such changes are contemplated as may come within the scope of the claims.

What I claim:

1. In an outboard motor having a power head, having a propeller shaft, and having a transmission connected to said power head and to said propeller shaft; a throttle arm on said power head mounted for opening movement from an idle position; a first spring coacting with said throttle arm to normally urge the latter in a throttle opening direction; a movable auxiliary arm mounted on said power head for movement independent of said throttle arm and having a portion normally engaged by said throttle arm to limit the movement of the latter in a throttle opening direction; operating linkage connected to said auxiliary arm; a second spring stronger than said first spring connected to said operating linkage in a manner to urge said auxiliary arm in a direction to move the throttle arm in a throttle closing direction; a movably mounted manually operable shifting lever connected to said transmission for shifting the latter, said shifting lever having a portion engageable with said operating linkage, and said lever being so positioned that when it is moved to one position it actuates said linkage against the action of said second spring to move the auxiliary arm in a direction to permit the first spring to move the throttle arm toward open position; and manually operable means in addition to said shifting lever and independent of said auxiliary arm, said last mentioned means being connected to said throttle arm to move the latter toward closed position.

2. In an outboard motor having a power head, having a propeller shaft, and having a transmission connected to said power head and to said propeller shaft; a movable throttle arm on said power head; a first spring coacting with said throttle arm to normally urge the latter in a throttle opening direction; a movable auxiliary arm mounted on said power head for movement independent of said throttle arm and having a portion normally engaged by said throttle arm to limit the movement of the latter in a throttle opening direction; stop means for limiting the movement of said auxiliary arm in a throttle closing direction to provide a predetermined minimum setting above idle to which the throttle arm may be urged by said auxiliary arm; operating linkage connected to said auxiliary arm; a second spring stronger than said first spring connected to said operating linkage in a manner to urge said auxiliary arm in a direction to move the throttle arm in a throttle closing direction; a movably mounted manually operable shifting lever connected to said transmission for shifting the latter, said shifting lever having a portion engageable with said operating linkage, said lever being so positioned that when it is moved to one position it actuates said linkage against the action of said second spring to move the auxiliary arm in a direction to permit the first spring to move the throttle arm toward open position; and manually operable means in addition to said shifting lever and independent of said auxiliary arm, said last mentioned means being connected to said throttle arm to move the latter toward closed position.

3. In an outboard motor having a power head, having a propeller shaft, and having a transmission connected to said power head and to said propeller shaft; a movable throttle arm on said power head; a first spring coacting with said throttle arm to normally urge the latter in a throttle opening direction; a movable auxiliary arm mounted on said power head and engageable with a portion of said throttle arm to limit the movement of the latter in a throttle opening direction; operating linkage connected to said auxiliary arm; a second spring stronger than said first spring connected to said operating linkage in a manner to urge said auxiliary arm in a direction to move the throttle arm in a throttle closing direction; a movably mounted manually operable shifting lever connected to said transmission for shifting the latter, said shifting lever having a portion engageable with said operating linkage, said lever being so positioned that when it is moved to one position it actuates said linkage against the action of said second spring to move the auxiliary arm in a direction to permit the first spring to move the throttle arm toward open position; a manual control in addition to said shifting lever, linkage connecting said manual control to said throttle arm, said linkage including a pair of independently movable arms mounted on the head and having abutment portions positioned to transmit motion between said arms in a throttle closing direction only.

4. In an outboard motor having a powerhead and having a reversing transmission: a throttle on said powerhead; a first spring means urging said throttle toward open position; operating linkage for said transmission including a pivotally mounted bell crank lever and including a manually operated movably mounted shifting lever positionable in forward, neutral, and reverse positions; throttle operating linkage connected to said throttle and including a second spring which is stronger than said first spring means normally urging said throttle toward closed position, said linkage also having a portion positioned for engagement by said shifting lever from neutral and movable thereby against the action of the second spring to permit opening of said throttle by said weaker first spring means when said lever is moved to forward position; and a link forming a toggle connection between said throttle linkage and the bell crank of said transmission operating linkage, said bell crank being positioned to cause movement of the throttle linkage a predetermined amount against the action of said second spring to permit opening of said throttle a predetermined limited amount by said first spring upon movement of the shifting lever to reverse position.

5. In an outboard motor having a power head and having a propeller shaft: shiftable transmission means providing for direct forward drive, providing a neutral in which no rotation is imparted to the propeller shaft, and providing a reverse, and including a planetary transmission connected between said power head and propeller shaft; a throttle on said power head movable between a relatively slow speed neutral position and a full speed position; a movably mounted manually operable shifting lever connected to said transmission means for shifting the latter, said lever having forward, neutral and reverse positions; throttle linkage on said power head connected to said throttle and having spring means normally urging said throttle toward said neutral position, said shifting lever having a portion positioned for engagement with said throttle linkage when said shifting lever is in forward position to move said linkage and advance said throttle, said portion of the shafting lever being disengaged from said throttle linkage when said shifting lever is in neutral position; and a second linkage connected to said shifting lever and to said throttle linkage and positioned to move said throttle linkage and throttle to a predetermined position above neutral when said shifting lever is in reverse.

6. In an outboard motor: a power head having a drive shaft; a sun gear fixed to said drive shaft; a planet pinion carrier rotatably mounted on said drive shaft; a planet pinion rotatably mounted on said carrier and positioned to mesh with the sun gear; a ring gear coaxial with said drive shaft and positioned to mesh with said planet pinion; a driven shaft driven by said ring gear; means including a releasable clutch for directly connecting said drive shaft to said carrier to cause direct drive of said driven shaft by said drive shaft; releasable brake means engageable with said carrier to prevent rotation thereof and cause reverse rotation of the driven shaft when the clutch is released, said sun gear, planet pinion and ring gear being of a size to cause the driven shaft to rotate at a substantially reduced speed relative to the drive shaft when said driven shaft is rotating in a reverse direction; and means including linkage connected to said clutch and brake means to prevent engagement of one of said means when the other is engaged.

7. In an outboard motor: a power head having a throttle and having a drive shaft; a sun gear fixed to said drive shaft; a planet pinion carrier rotatably mounted on said drive shaft; a planet pinion rotatably mounted on said carrier and positioned to mesh with the sun gear; a ring gear coaxial with said drive shaft and positioned to mesh with said planet pinion; a driven shaft driven by said ring gear; means including a releasable clutch for directly connecting said drive shaft to said carrier to cause direct drive of said driven shaft by said drive shaft; releasable brake means engageable with said carrier to prevent rotation thereof and cause reverse rotation of the driven shaft when the clutch means is released, said sun gear, planet pinion and ring gear being of a size to cause the driven shaft to rotate at a substantially reduced speed relative to the drive shaft when said driven shaft is rotating in a reverse direction; a first linkage mechanism connecting said clutch and brake means to prevent engagement of one of said means when the other is engaged; and second linkage mechanism connecting said first linkage mechanism with said throttle in a manner to open said throttle a predetermined limited amount when said brake means is engaged.

8. In an outboard motor: a power head having a drive shaft; a sun gear fixed to said drive shaft; a planet pinion carrier rotatably mounted on said drive shaft; a planet pinion rotatably mounted on said carrier and positioned to mesh with the sun gear; a ring gear coaxial with said drive shaft and positioned to mesh with said planet pinion; a driven shaft driven by said ring gear; means including a releasable clutch for directly connecting said drive shaft to said carrier to cause direct drive of said driven shaft by said drive shaft; releasable brake means engageable with said carrier to prevent rotation thereof and cause reverse rotation of the driven shaft when the clutch means is released, said driven shaft having no rotation imparted thereto when both the brake means and the clutch means are released; a movably mounted operating lever connected to said clutch and movable in one direction to engaged position; a movably mounted operating lever connected to said brake means and movable in the opposite direction to engaged position; and movable linkage connecting said operating levers and having selective positions wherein both levers are in released position, or wherein either lever is in engaged position, while the other is in disengaged position.

9. In an outboard motor having a vertical drive shaft and having a propeller: means including a planetary transmission driven by said drive shaft for operating said propeller, said transmission including a rotatable planet pinion carrier coaxial with said drive shaft; a brake drum fixed to said carrier and surrounding said drive shaft; releasable clutch means providing a forward driving connection between said brake drum and said drive shaft when engaged; and a releasable brake band engageable with said brake drum for locking said drum against rotation to provide a reverse driving connection, said transmission including planetary gearing sized to provide a substantial speed reduction in reverse.

10. In an outboard motor having a powerhead and having a propeller: a vertical drive shaft depending from said powerhead; a cup-shaped ring gear coaxial with said drive shaft and formed in its closed end with an axial bearing recess in which the lower end of said drive shaft is journalled for rotation relative thereto; a driven shaft fixed to and depending from said ring gear and drivingly connected to said propeller; a sun gear formed on said drive shaft within said ring gear; a planet pinion carrier rotatably mounted on said drive shaft adjacent said sun gear; a planet pinion rotatably carried by said carrier and positioned to mesh with said sun and ring gears; a brake drum fixed to said carrier and surrounding said drive shaft above said carrier; releasable clutch means within said brake drum providing a driving connection between said drive shaft and said brake drum when engaged; and a releasable brake band engageable with the exterior of said brake drum for locking said drum against rotation.

11. In an outboard motor having a powerhead and having a propeller: a vertical drive shaft depending from said powerhead; a cup-shaped ring gear coaxial with said drive shaft and formed in its closed end with an axial bearing recess in which the lower end of said drive shaft is journalled for rotation relative thereto; a driven shaft fixed to and depending from said ring gear and drivingly connected to said propeller; a sun gear formed on said drive shaft within said ring gear; a planet pinion carrier rotatably mounted on said drive shaft adjacent said sun gear; a planet pinion rotatably carried by said carrier and positioned to mesh with said sun and ring gears; a brake drum fixed to said carrier and surrounding said drive shaft above said carrier; a releasable disc-type clutch within said brake drum providing a driving connection between said drive shaft and said brake drum when engaged; and a releasable brake band engageable with the exterior of said brake drum for locking said drum against rotation.

12. In an outboard motor having a powerhead and having a propeller: a vertical drive shaft depending from said power head; a cup-shaped ring gear coaxial with said drive shaft and formed in its closed end with an axial bearing recess in which the lower end of said drive shaft is journalled for rotation relative thereto; a driven shaft fixed coaxially to and depending from said ring gear and drivingly connected to said propeller; a sun gear formed on said drive shaft within said ring gear; a planet pinion carrier rotatably mounted on said drive shaft adjacent said sun gear; a planet pinion rotatably carried by said carrier and positioned to mesh with said sun and ring gears; a brake drum fixed to said carrier and surrounding said drive shaft above said carrier; a releasable disc-type clutch within said brake drum providing a driving connection between said drive shaft and said brake drum when engaged; means including a helical compression spring surrounding said drive shaft above said clutch for normally urging said clutch into engagement; and a releasable brake band engageable with the exterior of said brake drum for locking said drum against rotation.

13. In an outboard motor having a powerhead and having a propeller: a vertical drive shaft depending from said powerhead; a cup-shaped ring gear coaxial with said drive shaft and formed in its closed end with an axial bearing recess in which the lower end of said drive shaft is journalled for rotation relative thereto; a driven shaft fixed coaxially to and depending from said ring gear and drivingly connected to said propeller; a sun gear formed on said drive shaft within said ring gear; a planet pinion carrier rotatably mounted on said drive shaft adjacent said sun gear; a planet pinion rotatably carried by said carrier and positioned to mesh with said sun and ring gears; a brake drum fixed to said carrier and surrounding said drive shaft above said carrier; a releasable disc-type clutch within said brake drum providing a driving connection between said drive shaft and said brake drum when engaged; a pressure plate axially and non-rotatably slidable on said drive shaft above said clutch; a compression spring surrounding said drive shaft above said pressure plate and urging said pressure plate downwardly against said clutch to normally cause engagement of said clutch; cam operated means for lifting said pressure plate against the compression of said spring to disengage said clutch; and a releasable brake band engageable with the exterior of said brake drum for locking said drum against rotation.

14. In an outboard motor having a powerhead, having a propeller shaft, and having a transmission connected to said powerhead and to said propeller shaft; a movable throttle arm on said powerhead; a first spring connected to said throttle arm to normally urge the latter in a throttle opening direction; a movable auxiliary arm mounted on said powerhead and engageable with a portion of said throttle arm to limit the movement of the latter in a throttle opening direction; operating linkage connected to said auxiliary arm; a second spring stronger than said first spring so connected to said operating linkage as to urge said auxiliary arm in a direction to move the throttle arm in a throttle closing direction; stop means for limiting the movement of the throttle linkage in the direction in which it is urged by said second spring; a movably mounted manually operable shifting lever connected to said transmission for shifting the latter; a cam member adjustably mounted on said shifting lever and engageable with said operating linkage, and said lever and cam being so positioned that when said lever is moved to one position the cam actuates said linkage against the action of said second spring to move the auxiliary arm in a direction to permit the first spring to move the throttle arm toward open position.

15. In an outboard motor having a powerhead and having a propeller: a vertical drive shaft depending from said powerhead; a cup-shaped ring gear coaxial with said drive shaft and formed in its closed end with an axial bearing recess in which the lower end of said drive shaft is journalled for rotation relative thereto; a driven shaft fixed to and depending from said ring gear and drivingly connected to said propeller; a sun gear formed on said drive shaft within said ring gear; a planet pinion carrier rotatably mounted on said drive shaft adjacent said sun gear; a planet pinion rotatably carried by said carrier and positioned to mesh with said sun and ring gears; a brake drum fixed to said carrier and surrounding said drive shaft; releasable clutch means providing a driving connection between said drive shaft and said brake drum when engaged; and a releasable brake band engageable with said brake drum for locking said drum against rotation.

ARTHUR R. LONG.

References Cited in the file of this patent

UNITED STATES PATENTS

| Number | Name | Date |
|---|---|---|
| 1,620,764 | Hull | Mar. 15, 1927 |
| 1,843,272 | Evinrude | Feb. 2, 1932 |
| 1,933,481 | Mathias | Oct. 31, 1933 |
| 1,941,360 | Mathias | Dec. 26, 1933 |
| 2,071,634 | Irgens | Feb. 23, 1937 |
| 2,229,055 | Dick | Jan. 21, 1941 |
| 2,321,098 | Morse | June 8, 1943 |

FOREIGN PATENTS

| Number | Country | Date |
|---|---|---|
| 514,785 | France | Nov. 18, 1920 |